Jan. 13, 1948.  O. F. RUNDE  2,434,590
HYDRAULIC TRANSMISSION
Filed Jan. 30, 1946  2 Sheets-Sheet 1
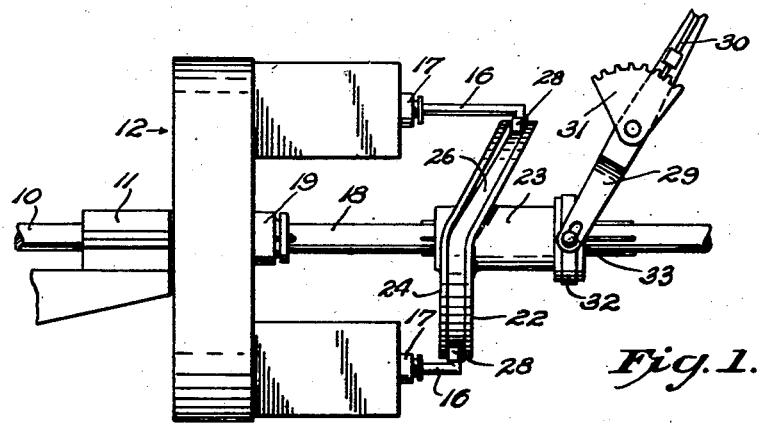
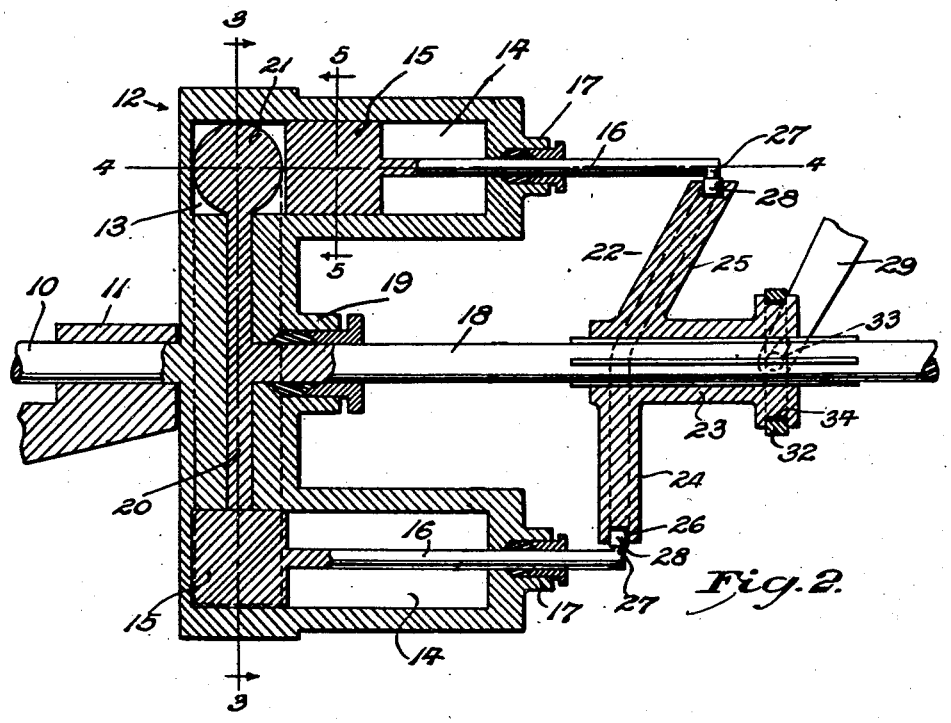
INVENTOR.
Oliver F. Runde
BY
Attorney Patented Jan. 13, 1948

2,434,590

UNITED STATES PATENT OFFICE 2,434,590

HYDRAULIC TRANSMISSION

Oliver F. Runde, Columbus, Ohio

Application January 30, 1946, Serial No. 644,344

5 Claims. (Cl. 192—59)

My invention relates to hydraulic power transmissions and, more particularly, to transmissions of the type incorporating a driving member, a driven member, and valves which serve to restrict the flow of fluid and thereby produce a driving relation between the two members.

In the past, considerable difficulty, with mechanisms of this type, has been encountered due to the lack of synchronization of the various movable parts.

It is the general object of my invention to provide an hydraulic power transmitting mechanism which eliminates the use of a multiplicity of separate gears to produce variable speeds between a driving and a driven member.

It is another object of my invention to provide a fluid transmission which is adapted to produce a variation in driving power, from zero torque to full torque, between the driving and the driven elements.

It is still another object of my invention to provide a fluid transmission which embodies a positive synchronization between its opposing movable parts.

For a further and complete understanding of my invention, reference is made to the following description and attached drawings, wherein:

Fig. 1 is a side elevational plan view of my improved fluid power transmission;

Fig. 2 is a vertical sectional view disclosing the driving and driven members in the full torque transmitting condition;

Figure 3:
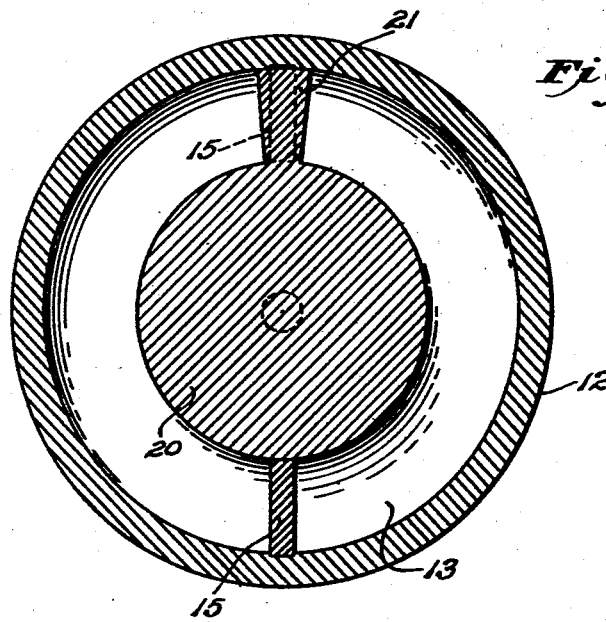
Fig. 3 is a transverse sectional view taken along the line 3—3 of Fig. 2.
Figure 4:
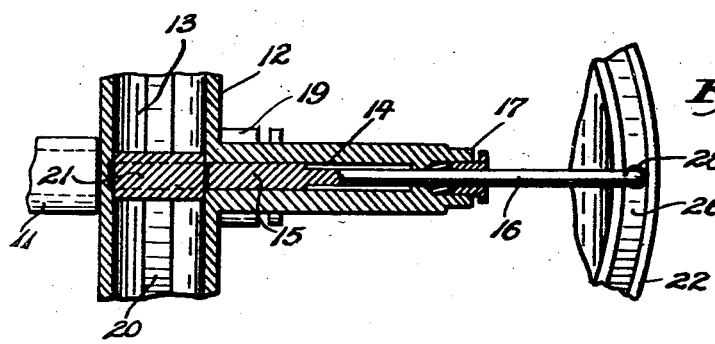
Fig. 4 is a fragmentary horizontal sectional view taken along the line 4—4 of Fig. 2.
Figure 5:
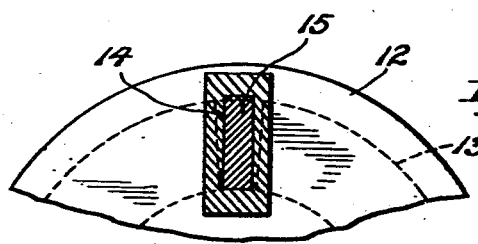
Fig. 5 is a fragmentary vertical sectional view along the line 5—5 of Fig. 2.

With particular reference to the drawings, it will be seen that my hydraulic power-transmitting mechanism includes a driven shaft 10 rotatably supported by a bearing 11 axially united with a driven element 12. The driven element 12 comprises a circular fluid chamber 13 in communication with a pair of diametrically opposed laterally situated valve compartments 14 which receive a pair of slide valves 15. The valves 15 are formed to provide valve stems 16 which extend externally of the driven element 12 through fluid-tight bushings 17 at the ends of the valve compartments.

The driving member comprises a shaft 18 introduced axially of the driven member by means of a fluid-tight connection 19. The shaft 18 forms at its inner end a circular disk 20 which is freely interposed between the inner walls of the driven element 12. A vane or piston 21 is formed at the edge of the disk 20 and fits within the fluid chamber 13.

A wabble plate 22 having a central tubular sleeve 23 is splined to the shaft 18 externally of the driven element 12. The wabble plate 22, connected to the shaft in this manner, is rotatable with the shaft but longitudinally moveable thereon within limits. The wabble plate is formed of two semi-circular portions disposed in angular relation to one another. The node portion 24 is substantially perpendicular to the axis of the sleeve 23; the dwell portion 25 forming substantially an acute angle with the sleeve. The wabble plate 22 also contains a track 26 at its peripheral edge.

The outer ends of the valve stems 16 are formed with perpendicular extensions 27 which serve to hold antifriction rings 28 having substantially the diametrical size of the track 26. These rings 28 freely fit within the track 26 and serve to link the valves with the wabble plate so as to cause a reciprocating movement of the valves within the valve compartments 14 upon the rotation of the wabble plate.

A manually operable lever 29 having a locking device 30 is pivotally connected to a stationary member 31 and has its lower end connected with a circular collar 32 by slot and pin means 33. The collar 32 is retained on the outer end of the sleeve 23 by an annular groove 34 and is restricted to longitudinal movement but rotatably free within the groove. Thus by moving the lever 29, the sleeve 23 is moved longitudinally on the drive shaft 18 which in turn controls the length of projection of the valves 15, linked with the wabble plate 22, into the circular fluid chamber 13.

In operation, the drive shaft 18, in direct connection with a power source, not shown, rotates the piston 21 within the circular fluid chamber 13. The rotation of the piston in turn imparts motion to a liquid confined within the fluid chamber. Thus, it may be seen that by introducing one of the slide valves 15 into the fluid chamber, the flow of the liquid will exert a force upon the valve and correspondingly transmit torque to the driven element 12.

The extent of projection of the valves 15 within the fluid chamber 13 is controlled from zero projection to full projection by the longitudinal movement of the wabble plate 22 and its associated sleeve. Thus the flow of liquid may be either unrestricted, partially, or fully restricted and thereby torque transmission, between the driving and driven elements, may be varied from zero torque to full torque.

The cam action of the wabble plate 22 serves to alternately introduce the valves 15 into and out of the fluid chamber in a manner to allow the rotation of the piston within the chamber when there is relative rotary motion between the drive and driven elements.

With reference to Fig. 2 of the drawings, it will be noted that synchronization between the valves 15 and the piston 21 is accomplished by locating the wabble plate 22 on the shaft 18 so as to align the vertical axis of the piston with the vertical axis of the semicircular dwell portion 25 of the wabble plate, thereby assuring that the valves will be withdrawn from the fluid chamber as the piston passes.

In view of the foregoing, it will be seen that I have provided a relatively simple, highly efficient fluid transmission which incorporates means whereby the torque transfer, between the drive and the driven elements, may be varied from zero torque to full torque in a smooth and easily accomplished manner. My invention is characterized by its structural simplicity, ease of operation and its positive operating action.

While I have disclosed what I now deem to be a preferred form of my invention, it will be understood that various modifications in design and details of construction may be later accomplished without departing from the spirit of the invention or the scope of the following claims.

I claim:

1. A hydraulic power-transmitting mechanism comprising a rotatably supported driven member formed with a circular fluid-receiving piston chamber, the latter communicating with a pair of diametrically opposed and laterally situated valve compartments, a drive member disposed in axial relation to the driven member, a piston formed for rotation with said drive member and occupying said piston chamber, slidable valves positioned for movement within said compartments, a cam wheel rotatable with said drive member and longitudinally movable thereon, means for adjusting the longitudinal operating positions of the cam wheel in relation to the drive member, and shaft means actuated by the cam wheel for alternately reciprocating said valves into and out of said piston chamber in synchronized relation with the rotation of said piston and maintaining the synchronized relation at any longitudinal operating position of the cam wheel.

2. A hydraulic power-transmitting mechanism comprising a rotatably supported driven member formed with an annular internal fluid-receiving cylinder, the latter communicating with a pair of diametrically opposed and laterally situated valve chambers, a drive shaft disposed in axial relation to the driven member, a piston formed for rotation with said drive shaft and disposed within said cylinder, slidable valves positioned for movement within said chambers, valve stems rigidly connected with said valves and extending externally of said chambers, a cam wheel having an annular track at its periphery and located externally of said driven member, said cam wheel being rotatable with said drive shaft and longitudinally movable thereon, stationary means for adjusting the longitudinal movement of the cam wheel, and anti-friction means connected with the ends of said valve stems and disposed within the annular track of said cam wheel so as to cause alternately reciprocating movement of said valves into and out of said cylinder in synchronized relation with the rotation of said piston and maintaining the synchronized relation at any longitudinal operating position of the cam wheel.

3. A hydraulic power-transmitting mechanism comprising a rotatably supported driven member formed with an annular internal fluid-receiving cylinder, the latter communicating with a pair of diametrically opposed and laterally situated valve chambers, slidable valves positioned for movement within said chambers, said valves having integral stems extending externally of said chambers, a driving member including a shaft disposed in axial relation to the driven member, a piston formed for rotation with said shaft and disposed within said cylinder, a wabble plate rotatable with said shaft and having a circular track substantially at its periphery, said plate being located externally of said driven member and longitudinally movable on said shaft, means connecting the external ends of said valve stems with the track of said wabble plate so as to impart alternately reciprocating movement of said valves into and out of said cylinder in synchronized relation with the rotation of said piston, and manually operable means for controlling the longitudinal movement of said wabble plate so as to regulate the extent of projection of said valves into said cylinder.

4. A hydraulic power-transmitting mechanism comprising a rotatably supported driven element formed with a circular fluid-receiving chamber and having a driven shaft united axially therewith, said chamber communicating with a pair of diametrically opposed and laterally situated valve compartments, slidable valves positioned for movement within said compartments, said valves having stems extending externally of said compartments, a drive member disposed in axial relation to the driven member, a piston formed for rotation with said drive member and occupying said chamber, a wabble plate including a central tubular sleeve rotatable with said drive member and longitudinally movable thereon, pivotally mounted lever means connected with said tubular sleeve for adjusting the longitudinal movement of said wabble plate on said drive member, means connecting the outer ends of said valve stems with the wabble plate so as to cause alternately reciprocating movement of the valves into and out of the fluid-receiving chamber in synchronized relation with the rotation of said piston, and means for maintaining the synchronized relation at all relative speeds between the drive and driven members.

5. A hydraulic power-transmitting mechanism comprising a driven member and a drive member disposed in axial relation to one another, one of said members being formed with a circular fluid-receiving chamber, the latter communicating with a pair of diametrically opposed and laterally situated valve chambers, a piston carried by the other of said members and occupying said fluid chamber, slidable valves positioned for movement within said valve chambers, a cam wheel rotatable with said last-named member and longitudinally movable thereon, means for adjusting the longitudinal movement of the cam wheel in relation to said last-named member, and shaft means actuated by the cam wheel for alternately reciprocating said valves into and out of said fluid chamber in synchronized relation with the rotation of said piston and maintaining the synchronized relation at any longitudinal operating position of the cam wheel.

OLIVER F. RUNDE.

REFERENCES CITED

The following references are of record in the file of this patent:

UNITED STATES PATENTS

| Number | Name | Date |
|---|---|---|
| 799,102 | Sparks | Sept. 12, 1905 |